United States Patent
Mun et al.

(10) Patent No.: US 12,475,680 B2
(45) Date of Patent: Nov. 18, 2025

(54) METHOD OF TRAINING IMAGE REPRESENTATION MODEL

(71) Applicant: SAMSUNG ELECTRONICS CO., LTD., Suwon-si (KR)

(72) Inventors: Minyoung Mun, Suwon-si (KR); Seijoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 18/116,602

(22) Filed: Mar. 2, 2023

(65) Prior Publication Data

US 2024/0078785 A1 Mar. 7, 2024

(30) Foreign Application Priority Data

Sep. 2, 2022 (KR) ........................ 10-2022-0111092

(51) Int. Cl.
*G06V 10/764* (2022.01)
*G06V 10/74* (2022.01)

(52) U.S. Cl.
CPC .......... *G06V 10/761* (2022.01); *G06V 10/764* (2022.01)

(58) Field of Classification Search
CPC ..... G06V 10/761; G06V 10/764; G06V 10/82
See application file for complete search history.

(56) References Cited

U.S. PATENT DOCUMENTS

| | | | | |
|---|---|---|---|---|
| 10,102,454 | B2 * | 10/2018 | Merler | G06F 18/2415 |
| 10,832,062 | B1 * | 11/2020 | Evans | G06V 10/761 |
| 11,347,975 | B2 * | 5/2022 | Krishnan | G06V 10/774 |
| 11,354,778 | B2 * | 6/2022 | Chen | G06T 5/70 |
| 2020/0090039 | A1 * | 3/2020 | Song | G06V 10/454 |
| 2022/0147838 | A1 * | 5/2022 | Gu | G06V 20/00 |
| 2022/0156593 | A1 * | 5/2022 | Liu | G06F 18/2155 |
| 2023/0011503 | A1 * | 1/2023 | Duke | G06F 16/55 |

OTHER PUBLICATIONS

Chen, Ting, et al. "A simple framework for contrastive learning of visual representations." International conference on machine learning. PmLR. (Year: 2020).*

(Continued)

*Primary Examiner* — Shaghayegh Azima
(74) *Attorney, Agent, or Firm* — NSIP Law

(57) ABSTRACT

A method generates an anchor image embedding vector for an anchor image using an image representation model, determine first similarities between the anchor image and negative samples of the anchor image using first image embedding vectors for the negative samples and the generated anchor image embedding vector, determine second similarities between the anchor image and positive samples of the anchor image using second image embedding vectors for the positive samples and the generated anchor image embedding vector, obtain one of a vector corresponding to a label of the anchor image and third similarities between the label of the anchor image and labels of the negative samples, determine a loss value for the anchor image based on the determined first similarities, and the determined second similarities, and one of the obtained third similarities and a fourth similarity.

20 Claims, 6 Drawing Sheets

(56) References Cited

OTHER PUBLICATIONS

Robinson, Joshua, et al. "Contrastive learning with hard negative samples." arXiv preprint arXiv:2010.04592 (2020). (Year: 2020).*
Khosla, Prannay, et al. "Supervised contrastive learning." Advances in neural information processing systems 33. (Year: 2022).*
Chen, Ting, et al. "A simple framework for contrastive learning of visual representations." *International conference on machine learning*. PMLR, (2020). pp 1-11.
Robinson, Joshua, et al. "Contrastive learning with hard negative samples." arXiv preprint arXiv:2010.04592 vol. 2. (2020). pp 1-28.
Khosla, Prannay, et al. "Supervised contrastive learning." *Advances in neural information processing systems* 33 (2020). pp 1-13.

\* cited by examiner

METHOD OF TRAINING IMAGE REPRESENTATION MODEL

CROSS-REFERENCE TO RELATED APPLICATIONS

This application claims the benefit under 35 USC § 119(a) of Korean Patent Application No. 10-2022-0111092, filed on Sep. 2, 2022, in the Korean Intellectual Property Office, the entire disclosure of which is incorporated herein by reference for all purposes.

BACKGROUND

1. Field

The following disclosure relates to a method of training an image representation model.

2. Description of Related Art

Existing approaches for unsupervised contrastive learning may train a model using unlabeled image data. In this case, training may be performed so that the distance between an anchor image and a positive sample decreases and the distance between the anchor image and a negative sample increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a training method performed by a computing apparatus includes generating an anchor image embedding vector for an anchor image using an image representation model, determining first similarities between the anchor image and negative samples of the anchor image using first image embedding vectors for the negative samples and the generated anchor image embedding vector, determining second similarities between the anchor image and positive samples of the anchor image using second image embedding vectors for the positive samples and the generated anchor image embedding vector, obtaining one of a vector corresponding to a label of the anchor image and third similarities between the label of the anchor image and labels of the negative samples, determining a loss value for the anchor image based on (i) the determined first similarities, (ii) the determined second similarities, and (iii) one of the obtained third similarities and a fourth similarity, wherein the fourth similarity is a similarity between the obtained vector and the generated anchor image embedding vector, and updating weights of the image representation model based on the determined loss value.

The positive samples and the anchor image may belong to a same class, and the negative samples do not belong to the class.

The determining of the loss value may include applying the obtained third similarities as weights to each of the determined first similarities, calculating normalized values for the obtained third similarities, and determining the loss value using a result of applying the obtained third similarities as weights to each of the determined first similarities, the calculated normalized values, and the determined second similarities.

The training method may further include determining similarities of pairings of labels of respective images in a training data set using an embedding model, generating a first dictionary to store the similarities for the pairings, forming a batch of images extracted from the training data set, forming an image set corresponding to the batch by performing augmentation on the images in the formed batch, and retrieving, from the first dictionary, similarities for respective pairings of labels of the batch.

The obtaining may include obtaining the third similarities from among the retrieved similarities.

The third similarities may be similarities between the vector corresponding to the label of the anchor image and vectors corresponding to the labels of the negative samples.

The vector corresponding to the label of the anchor image and the vectors corresponding to the labels of the negative samples may be generated by an embedding model.

The determining of the loss value may include determining an initial loss value using the determined first similarities and the determined second similarities, applying a first weight to the determined initial loss value, applying a second weight to the fourth similarity, and determining the loss value by subtracting the fourth similarity to which the second weight is applied from the initial loss value to which the first weight is applied.

The sum of the first weight and the second weight may be 1.

The training method may further include generating vectors respectively corresponding to labels of a training data set using an embedding model, generating a second dictionary to store the generated vectors, forming a batch by extracting images from the training data set, forming an image set corresponding to the formed batch by performing augmentation on the images in the formed batch, and retrieving vectors corresponding to labels of the formed batch from the second dictionary.

The obtaining may include obtaining the vector corresponding to the label of the anchor image from among the retrieved vectors.

In another general aspect, a computing apparatus may include a memory configured to store one or more instructions, and a processor configured to execute the stored instructions.

When the instructions are executed, the processor may be configured to generate an anchor image embedding vector for an anchor image using an image representation model, determine first similarities between the anchor image and negative samples of the anchor image using first image embedding vectors for the negative samples and the generated anchor image embedding vector, determine second similarities between the anchor image and positive samples of the anchor image using second image embedding vectors for the positive samples and the generated anchor image embedding vector, obtain one of a vector corresponding to a label of the anchor image and third similarities between the label of the anchor image and labels of the negative samples, determine a loss value for the anchor image based on (i) the determined first similarities, (ii) the determined second similarities, and (iii) one of the obtained third similarities and a fourth similarity, wherein the fourth similarity is a similarity between the obtained vector and the generated anchor image embedding vector, and update weights of the image representation model based on the determined loss value.

The positive samples and the anchor image may belong to a same class, and the negative samples and the anchor image may not belong to the class.

The processor may be configured to apply the obtained third similarities as weights to each of the determined first similarities, calculate normalized values for the obtained third similarities, and determine the loss value using a result of applying the obtained third similarities as weights to each of the determined first similarities, the calculated normalized values, and the determined second similarities.

The processor may be configured to determine similarities of pairings of labels of respective images in a training data set using an embedding model, generate a first dictionary to store the similarities for the pairings, form a batch of images extracted from the training data set, form an image set corresponding to the batch by performing augmentation on the images in the formed batch, and retrieve, from the first dictionary, similarities for respective pairings of labels of the batch.

The processor may be configured to obtain the third similarities from among the retrieved similarities.

The third similarities may be similarities between the vector corresponding to the label of the anchor image and vectors corresponding to the labels of the negative samples.

The vector corresponding to the label of the anchor image and the vectors corresponding to the labels of the negative samples may be generated by an embedding model.

The processor may be configured to determine an initial loss value using the determined first similarities and the determined second similarities, apply a first weight to the determined initial loss value, apply a second weight to the fourth similarity, and determine the loss value by subtracting the fourth similarity to which the second weight is applied from the initial loss value to which the first weight is applied.

The sum of the first weight and the second weight may be 1.

The processor may be configured to generate vectors respectively corresponding to labels of a training data set using an embedding model, generate a second dictionary to store the generated vectors, form a batch by extracting images from the training data set, form an image set corresponding to the formed batch by performing augmentation on the images in the formed batch, and retrieve vectors corresponding to labels of the formed batch from the second dictionary.

The processor may be configured to obtain the vector corresponding to the label of the anchor image from among the retrieved vectors.

Other features and aspects will be apparent from the following detailed description, the drawings, and the claims.

Figure 1:
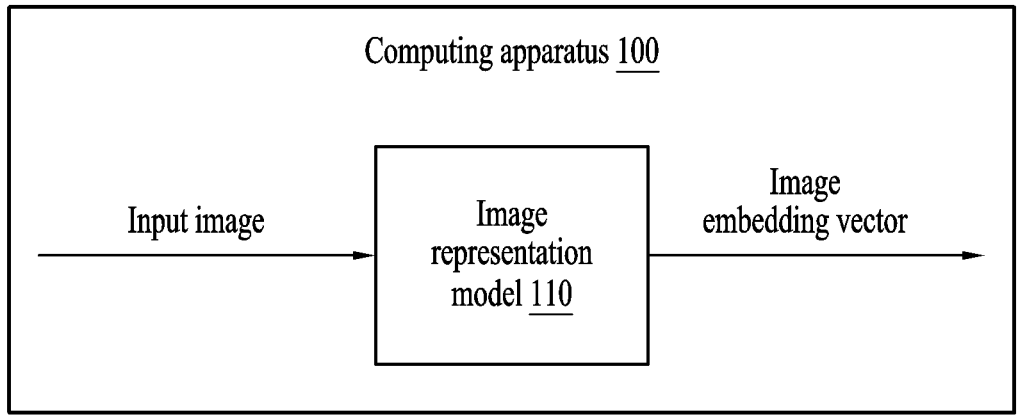
FIG. 1 illustrates an example of an image representation model, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like elements and a repeated description related thereto are omitted.

FIG. 1 illustrates an example of an image representation model, according to one or more embodiments.

Referring to FIG. 1, a computing apparatus 100 may store or include an image representation model 110.

The image representation model 110 may generate an image embedding vector from a given input image inputted thereto.

For example, the computing apparatus 100 may input an anchor image to the image representation model 110, and generate an image embedding vector for the anchor image (also referred to as an "anchor image embedding vector") using the image representation model 110. The anchor image may be in an image class.

The computing apparatus 100 may input a negative sample to the image representation model 110. The negative sample may be an image of a class different from that of the anchor image. The computing apparatus 100 may generate an image embedding vector for the negative sample (also referred to as a "first image embedding vector") using the image representation model 110.

The computing apparatus 100 may input a positive sample to the image representation model 110. The positive sample may be an image of the same class as that of the anchor image. The computing apparatus 100 may generate an image embedding vector for the positive sample (also referred to as a "second image embedding vector") using the image representation model 110.

The image representation model 110 may include an encoding model (or an encoder) and a projection model. The encoding model may include, for example, one or more convolutional layers (a convolutional neural network (CNN)), and the projection model may include, for example, normalization layers (e.g., L2 normalization layers). The encoding model may extract a feature (or a feature vector) from an input image (e.g., an anchor image, a negative sample, or a positive sample) and transmit the extracted feature vector to the projection model. The projection model may perform projection (e.g., L2 normalization) on the input feature vector to generate a projected feature vector (or a normalized feature vector). The image embedding vector (e.g., the anchor image embedding vector, the first image embedding vector, or the second image embedding vector) outputted/generated by the computing apparatus of FIG. 1 may be an output of the encoding model or an output of the projection model, i.e., may be a feature/embedding vector of the inputted image, which may or may not be L2-normalized.

The computing apparatus 100 may train the image representation model 110. In some examples, the encoding model is a CNN and the training includes training the CNN/encoding model. The computing apparatus 100 may train the image representation model 110 through supervised contrastive learning, which is described herein (see Equation 1).

Figure 2:
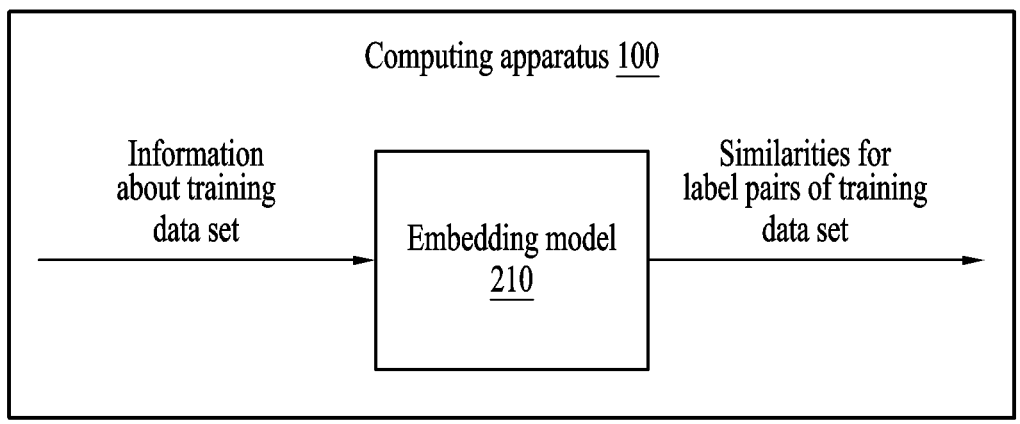
FIG. 2 illustrates an example of a computing apparatus generating a first dictionary using an embedding model, according to one or more embodiments.

FIG. 2 illustrates an example of a computing apparatus generating a first dictionary using an embedding model, according to one or more embodiments. Referring to FIG. 2, the computing apparatus 100 may include an embedding model 210.

The embedding model 210 may be a model that converts (or expresses) a given input (e.g., a word or speech data of a word uttered (or pronounced)) into a vector. The embedding model 210 may include, for example, a word embedding model, a speech embedding model, or the like. However, examples are not limited thereto. The word embedding model may, for example, convert an input word into a vector (hereinafter, referred to as a "word vector" or a "word embedding vector"). The speech embedding model may, for example, convert input speech data into a vector (hereinafter, referred to as a "speech vector" or a "speech embedding vector").

The embedding model 210 may be, in part, an existing embedding model that has already been implemented (e.g., Word2Vec, GloVe, Bert, Spacy, etc.) or an embedding model that has been trained in a customized way.

The computing apparatus 100 may transmit a training data set to the embedding model 210. The training data set may include training images to be used to train the image representation model 110 of FIG. 1. Each of these training images may have a label. The computing apparatus 100 may transmit the labels in the training data set to the embedding model 210 in ways that may facilitate training of the image representation model 110.

The computing apparatus 100 may determine (or calculate) a similarity (e.g., a cosine similarity, an inner product, a Euclidean distance, etc.) for a given label pair of the training data set using the embedding model 210. The labels of the training data set may be paired (for example, in all possible unique pairings) and the computing apparatus 100 may use the embedding model 210 to determine (or calculate) similarities between the pairs of labels of the training data set. For example, for any given pair of training labels, the embedding model 210 may compute embedding vectors for the respective labels in the pair and then the distance between those embedding vectors may be calculated. Note that the embedding model 210 may be referred to as performing functions such as computing distances, forming pairs of labels, etc. However, functionality other than generating embedding vectors may be performed outside, but in cooperation with, the embedding model. In other words, the embedding model may include a neural network for generating embedding vectors and other functionality (e.g., related to systematic processing of training labels) may or may not be included as part of the embedding neural network.

For example, in the example shown in FIG. 2, the computing apparatus 100 may input labels A, B, C, . . . , Y, and Z of the training data set to the embedding model 210. The embedding model may receive the input labels and the neural network thereof may generate embedding vectors (e.g., word embedding vectors, speech embedding vectors, etc.) respectively corresponding to the labels A, B, C, . . . , Y, and Z. The computing apparatus 100 may determine (or calculate) distances between the embedding vectors of the labels to determine similarities between the corresponding labels. For example, for label A, similarities between label A and labels B to Z may be determined by computing distances between the embedding vector corresponding to the label A and the embedding vectors corresponding to the labels B to Z. Similarities between label B and labels C to Z may be computed by computing distances between B's embedding vector and the embedding vectors of labels C to Z. In this way, the computing apparatus 100 may determine (or calculate) similarities for combinable label pairs in the labels A, B, C, . . . , Y, and Z of the training data set (each training label associated with a respective training image as discussed above).

The computing apparatus 100 may store the calculated similarities (e.g., the similarities for the combinable label pairs of the training data set) in the form of a first dictionary. In an example, the computing apparatus 100 may implement the first dictionary in a data structure (e.g., a hash table, a B-tree, etc.) for fast data retrieval. The first dictionary stores an indication of each pair of labels in association with their similarity, and any given label can be "looked up" in the first dictionary to find its similarity to any of the other labels in the first dictionary.

Figure 3:
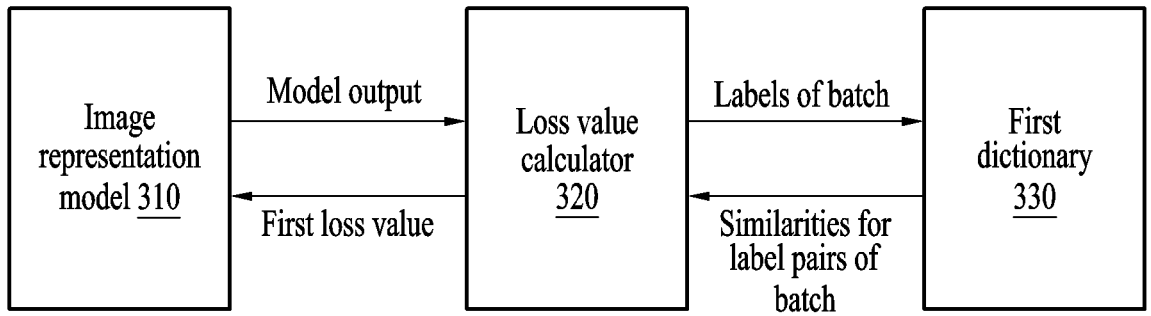
FIG. 3 illustrates an example of a computing apparatus training an image representation model, according to one or more embodiments.
Figure 4:
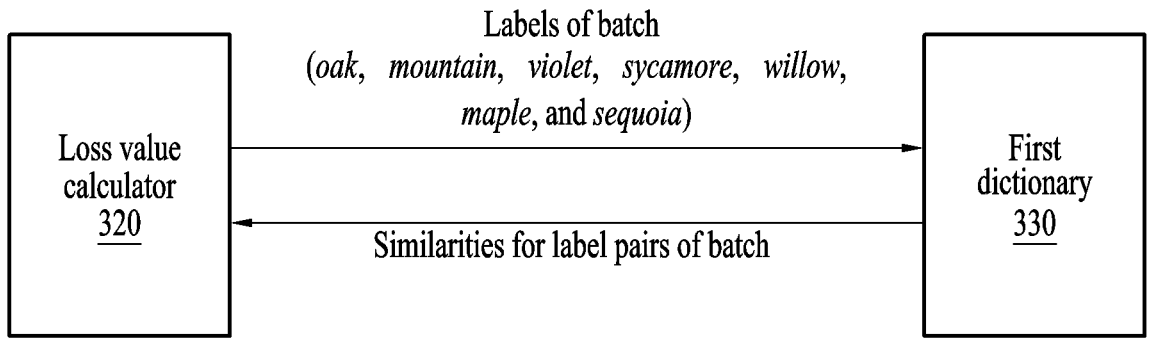
FIG. 4 illustrate an example of a computing apparatus training an image representation model, according to one or more embodiments.

FIGS. 3 and 4 illustrate an example of a computing apparatus training an image representation model, according to one or more embodiments.

Referring to FIG. 3, an image representation model 310 (e.g., the image representation model 110 of FIG. 1), a loss value calculator 320, and a first dictionary 330 are shown. The first dictionary 330 may correspond to the first dictionary described above with reference to FIG. 2.

The computing apparatus 100 may generate a first batch by randomly extracting (or sampling) images and respective labels from a training data set. If the batch size is, for example, "N", the computing apparatus 100 may generate the first batch by randomly extracting (or sampling) N images and N respectively corresponding labels from the training data set.

In an example, the computing apparatus 100 may form an image set I corresponding to the first batch by augmenting the images in the first batch. For example, the computing apparatus 100 may generate first augmented images by performing first augmentation (e.g., scaling, rotation, cropping, color adjustment, contrast adjustment, etc.) on the images in the first batch. For example, the computing apparatus 100 may generate second augmented images by performing second augmentation (e.g., scaling, rotation, cropping, color adjustment, contrast adjustment, etc.) on the images in the first batch. The first augmentation and the second augmentation may be the same as or different from each other. If the batch includes N images, the number of first augmented images may be "N" and the number of second augmented images may be "N". The computing apparatus 100 may form the image set I including the first augmented images and the second augmented images. The number of images in the image set I may be "2N", and each of the images may have a respective label as obtained from the training data.

The computing apparatus 100 may train the image representation model 310 based on the image set I, which may involve acquiring embedding vectors for the images in the image set I, computing image similarities and label similarities for the image set I, and computing a loss function based on the image similarities and label similarities.

Regarding the image similarities, the computing apparatus 100 may acquire an anchor image from the image set I and input the anchor image to the image representation model 310, which generates a corresponding anchor image embedding vector. For example, if the image representation model 310 is a CNN, the CNN may generate a feature/embedding vector for the anchor image. The computing apparatus 100 may input negative image samples (negatives of the anchor image) from the image set I to the image representation model 310, which generates first (negative) image embedding vectors for the respective negative image samples. The computing apparatus 100 may input positive image samples of the anchor image to the image representation model 310, which generates respective second (positive) image embedding vectors for the positive image samples.

The loss value calculator 320 may receive an output from the image representation model 310 (e.g., the generated anchor image embedding vector, the generated first image embedding vector, and the generated second image embedding vector). In the case of the anchor image, the loss value calculator 320 may determine image similarities (e.g., cosine similarities, inner products, Euclidean distances, etc.) between the anchor image and the negative image samples using distances between the anchor image embedding vector and the generated first/negative image embedding vectors, for example. Similarly, the loss value calculator 320 may determine image similarities (e.g., cosine similarities, inner products, Euclidean distances, etc.) between the anchor image and the positive image samples using distances between the anchor image embedding vector and the second/positive image embedding vectors, for example.

During the aforementioned generating of embedding vectors and computing of image similarities, the images in the image set I remain associated with their original training labels and such associations are available and used as described next for determining label/embedding similarities.

The loss value calculator 320 may look up the labels of the images of the first batch in the first dictionary 330 to quickly obtain (or receive) similarities for each unique pairing of label in the first batch (in some cases, less than all pairings may be used). In other words, the loss value calculator 320 may retrieve the similarities for the combinable unique label pairs of the first batch from the first dictionary 330 (which may have been pre-constructed with a word embedding model, for example, as per the description above).

For example, in the example shown in FIG. 4, the loss value calculator 320 may transmit/lookup the first batch's labels oak, mountain, violet, sycamore, willow, maple, and sequoia to/in the first dictionary 330. Accordingly, the loss value calculator 320 may receive similarities the pairs of the labels in the first batch from the first dictionary 330. As per the example, the combinable label pairs are (oak, mountain), (oak, violet), (oak, sycamore), (oak, willow), (oak, maple), (oak, sequoia), (mountain, violet), (mountain, sycamore), (mountain, willow), (mountain, maple), (mountain, sequoia), (violet, sycamore), (violet, willow), (violet, maple), (violet, sequoia), (sycamore, willow), (sycamore, maple), (sycamore, sequoia), (willow, maple), (willow, sequoia), and (maple, sequoia). The loss value calculator 320 may retrieve (or receive) similarities for the respective label pairs from the first dictionary 330.

The loss value calculator 320 may determine a loss value (e.g., a supervised contrastive loss value) for the anchor image in the image set I based on (i) the similarities between the anchor image and the negative image samples, (ii) the similarities between the anchor image and the positive image samples, and (iii) the similarities between the label of the anchor image and the labels of the negative samples. For example, a first loss function may be expressed by Equation 1 below. The loss value calculator 320 may determine a loss value $L_i^{wsupnorm}$ for an anchor image i through Equation 1 below.

$$L^{wsupnorm} = \sum_{i \in I} L_i^{wsupnorm} =$$

$$\sum_{i \in I} \frac{-1}{|P(i)|} \sum_{p \in P(i)} \log \frac{\exp(z_i \cdot z_p / \tau)}{\frac{|A(i)|}{\sum_{a \in A(i)} sim(\tilde{y}_l, \widetilde{y_a})} \sum_{a \in A(i)} sim(\tilde{y}_l, \widetilde{y_a}) \exp(z_i \cdot z_a / \tau)}$$

Equation 1

In Equation 1 above, I denotes the image set described above, and i denotes an anchor image sample (a "sample" may be an image and its label, in I). P(i) denotes a set of positive samples included in I, |P(i)| denotes the number of positive samples (positive with respect to the sample image i), and p denotes a positive sample. A(i) denotes a set of negative samples (or the set of samples except for the anchor image sample i in I), |A(i)| denotes the number of negative samples (or the number of samples except for the anchor image sample i in I), and a denotes a negative sample (or any sample except for the sample of the anchor image i). In Equation 1, variables ỹ and z correspond to image vectors and label vectors, respectively. In Equation 1, τ denotes a hyperparameter, and sim($\tilde{y}_l$, $\widetilde{y_a}$) denotes a label similarity between the anchor image sample i and a sample a (i.e., similarity of the label of anchor image sample i and the label of sample a). The loss value calculator 320 may determine sim($\tilde{y}_l$, $\widetilde{y_a}$) using a label/word vector $\tilde{y}_l$ corresponding to the label of anchor image i and a label/word vector $\widetilde{y_a}$ corresponding to the label of sample a (content of label/word vectors are described below, but generally, a vector of a label may be word similarities of that label to the other labels). The term $z_i \cdot z_a$ denotes the image similarity between the anchor image i and the image of sample a. Specifically, the loss value calculator 320 may determine a dot product between an anchor image embedding vector $z_i$ of the anchor image i and an image embedding vector $z_a$ of the image of sample a, which serves as the similarity between the anchor image i and the sample image a. The term $z_i \cdot z_p$ denotes an image similarity between the anchor image i and the image of a positive sample p. The loss value calculator 320 may determine a dot product between the anchor image embedding vector $z_i$ and an image embedding vector $z_p$ of the positive sample, which serves as the image similarity between the anchor image i and the image of the positive sample p.

In Equation 1 above, exp denotes an exponential function. In Equation 1 above, $$\frac{|A(i)|}{\sum_{a \in A(i)} sim(\tilde{y}_l, \widetilde{y_a})}$$

denotes a normalized value for sim($\tilde{y}_l$, $\widetilde{y_a}$). In Equation 1 above, the term $$\frac{|A(i)|}{\sum_{a \in A(i)} \exp(sim(\tilde{y}_l, \widetilde{y_a}))},$$

in which an exponential function is applied to sim($\tilde{y}_l$, $\widetilde{y_a}$), may be used, instead of the term $$\frac{|A(i)|}{\sum_{a \in A(i)} sim(\tilde{y}_l, \widetilde{y_a})}.$$

The loss value calculator 320 may use sim($\tilde{y}_l$, $\widetilde{y_a}$) as a weight of $z_i \cdot z_a$ (or exp ($z_i \cdot z_a / \tau$)). In other words, label-based similarities may be used to weight image-based similarities.

Regarding the label vectors ỹ, for example, if the label of the anchor image i is oak, then Table 1 below shows examples of similarities between the label oak and the labels mountain, violet, sycamore, willow, maple, and *sequoia*.

TABLE 1

|     | mountain | violet | sycamore | willow | maple | sequoia |
|-----|----------|--------|----------|--------|-------|---------|
| oak | 0.38     | 0.35   | 0.616    | 0.568  | 0.69  | 0.379   |

The numerical values in Table 1 above may be, for example, cosine similarities between a word vector of the label oak and word vectors of the labels mountain, violet, sycamore, willow, maple, and sequoia.

The loss value calculator 320 may apply the similarity sim($\tilde{y}_l$, $\widetilde{y_{a1}}$) (e.g., 0.38 in Table 1 above) between the label oak and the label mountain as a weight to the similarity (or exp ($z_i \cdot z_{a1} / \tau$)) between the anchor image i and a negative sample a1 with the label mountain.

The loss value calculator 320 may apply the similarity sim($\tilde{y}_l$, $\widetilde{y_{a2}}$) (e.g., 0.35 in Table 1 above) between the label oak and the label violet as a weight to the similarity (or exp ($z_i \cdot z_{a2} / \tau$)) between the anchor image i and a negative sample a2 with the label violet.

The loss value calculator 320 may apply the similarity sim($\tilde{y}_l$, $\widetilde{y_{a3}}$) (e.g., 0.616 in Table 1 above) between the label oak and the label sycamore as a weight to the similarity (or exp ($z_i \cdot z_{a3} / \tau$)) between the anchor image i and a negative sample a3 with the label sycamore.

The loss value calculator 320 may apply the similarity sim($\tilde{y}_l$, $\widetilde{y_{a4}}$) (e.g., 0.568 in Table 1 above) between the label oak and the label willow as a weight to the similarity (or exp ($z_i \cdot z_{a4} / \tau$)) between the anchor image i and a negative sample a4 with the label willow.

The loss value calculator 320 may apply the similarity sim($\tilde{y}_l$, $\widetilde{y_{a5}}$) (e.g., 0.69 in Table 1 above) between the label oak and the label maple as a weight to the similarity (or exp $(z_i \cdot z_{a5}/\tau)$) between the anchor image i and a negative sample a5 with the label maple.

The loss value calculator 320 may apply the similarity $\text{sim}(\tilde{y}_i, \widetilde{y_{a6}})$ (e.g., 0.379 in Table 1 above) between the label oak and the label *sequoia* as a weight to the similarity (or exp $(z_i \cdot z_{a6}/\tau)$) between the anchor image i and a negative sample a6 with the label *sequoia*.

Of the negative samples, a negative sample that is sufficiently close to the anchor image i in an image embedding space or another embedding space (e.g., a word embedding space, a speech embedding space, etc.) may be referred to as a hard negative sample (sufficiently meaning within a predetermined distance or threshold). In the example shown in FIG. 4, among the negative samples, the negative samples with the labels sycamore, willow, and maple may be hard negative samples. As previously described, sim $(\tilde{y}_i, \widetilde{y_a})$ may be used as a weight of $z_i \cdot z_a$ (or exp $(z_i \cdot z_a/\tau)$). Thus, a greater weight may be applied to a similarity between a hard negative sample and an anchor image than to is applied to similarities between the anchor image and the remaining (non-hard) negative samples. Accordingly, when performing training, among negative samples, the computing apparatus 100 may focus more on hard negative samples.

The loss value calculator 320 may calculate loss values $L_i^{wsupnorm}$ for the other anchor images in the image set I, and calculate a first loss value $L^{wsupnorm}$ in a first batch by summing the loss values $L_i^{wsupnorm}$ for the respective anchor images.

The loss value calculator 320 may transmit the first loss value to the image representation model 310.

The computing apparatus 100 may update the weights of the image representation model 310 based on the first loss value, for example using backpropagation or other techniques for applying loss to a neural network.

The computing apparatus 100 may form a second batch by extracting (or sampling) images corresponding to the batch size from the training data set, and may form an image set corresponding to the second batch. The computing apparatus 100 may train the image representation model 310 based on the image set corresponding to the second batch. In this regard, the description provided with reference to FIGS. 3 and 4 may apply. In other words, the loss-based learning based on a batch sampled from training data may be repeated for different sample batches.

For example, the computing apparatus 100 may generate an anchor image embedding vector for an anchor image (hereinafter, referred to as an "anchor image x") in the image set corresponding to the second batch using the image representation model 310. The computing apparatus 100 may generate first image embedding vectors for negative samples of the anchor image x using the image representation model 310. The computing apparatus 100 may generate second image embedding vectors for positive samples of the anchor image x using the image representation model 310. The computing apparatus 100 may determine similarities between the anchor image and the negative samples in the second batch using the anchor image embedding vector and the first image embedding vectors in the second batch. The computing apparatus 100 may determine similarities between the anchor image and the positive samples in the second batch using the anchor image embedding vector and the second image embedding vectors. The computing apparatus 100 may input labels of the second batch to the first dictionary 330, and obtain similarities for label pairs of the second batch from the first dictionary 330 by looking up the input labels in the first dictionary 330.

The computing apparatus 100 may calculate a loss value for the anchor image x by applying the similarities between the anchor image and the negative samples in the second batch, the similarities between the anchor image and the positive samples in the second batch, and the similarities for the label pairs of the second batch to Equation 1 above. Similarly, the computing apparatus 100 may calculate loss values for the other anchor images of the second batch. The computing apparatus 100 may calculate a first loss value in the second batch by summing the loss values for the anchor images in the second batch. The computing apparatus 100 may update the weights of the image representation model 310 again based on the first loss value in the second batch.

As described above, the computing apparatus 100 may perform training by focusing more on hard negative samples among negative samples, thereby further improving image classification accuracy.

Table 2 below shows examples of the accuracy of image classification based on the existing supervised contrastive learning (SupCon) and the accuracy of image classification based on the training (wSupCon_norm) described with reference to FIG. 4. Table 2 shows such results for the CIFAR100 dataset, and for the CIFAR10 dataset.

TABLE 2

| | Architecture | Dataset | Augmentation | Batch | Top-1 |
|---|---|---|---|---|---|
| SupCon | Resnet-50 | CIFAR100 | TwoCropTransform | 256 | 70.61 |
| wSupCon_norm | Resnet-50 | CIFAR100 | TwoCropTransform | 256 | 73.62 |
| SupCon | Resnet-50 | CIFAR10 | TwoCropTransform | 256 | 92.05 |
| wSupCon_norm | Resnet-50 | CIFAR10 | TwoCropTransform | 256 | 92.64 |

Referring to Table 2 above, when a dataset of CIFAR100 is used for image classification, the Top-1 accuracy of image classification based on the example (wSupCon_norm) is higher than the Top-1 accuracy of image classification based on SupCon. When a dataset of CIFAR10 is used for image classification, the Top-1 accuracy of image classification based on the example (wSupCon_norm) is higher than the Top-1 accuracy of image classification based on SupCon.

Figure 5:
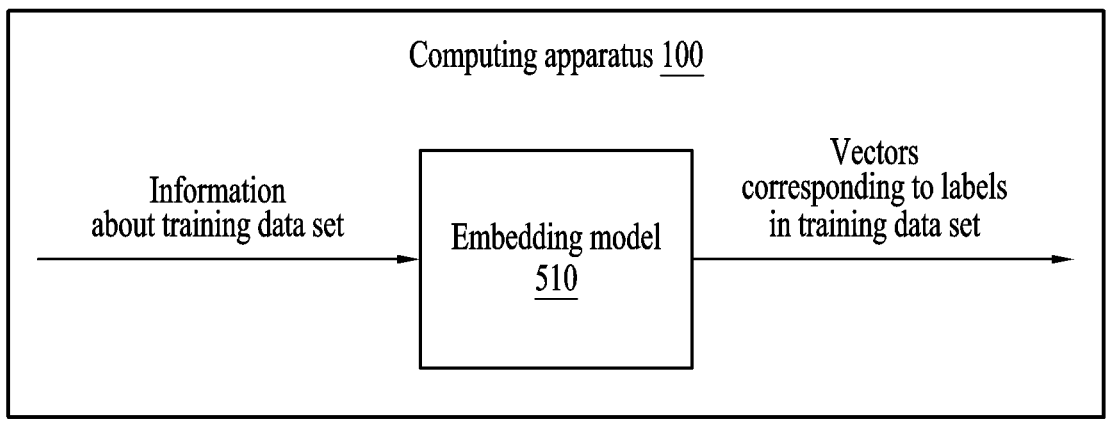
FIG. 5 illustrates an example of a computing apparatus generating a second dictionary using an embedding model, according to one or more embodiments.

FIG. 5 illustrates an example of a computing apparatus generating a second dictionary using an embedding model, according to one or more embodiments.

Referring to FIG. 5, the computing apparatus 100 may include an embedding model 510 (e.g., the embedding model 210).

The embedding model 510 may be a model that converts or expresses a given input (e.g., a word, voice data of a word uttered, etc.) into a vector (e.g., a word vector, a speech vector, etc.). The embedding model 510 may include, for example, a word embedding model, a speech embedding model, or the like. However, examples are not limited thereto.

The embedding model 510 may generate a high-dimensional embedding vector (e.g., a word vector, a speech vector, etc.) that is better separated by class in a latent space than an image embedding vector.

The embedding model 510 may be an existing embedding model that has already been generated (e.g., Word2Vec, GloVe, Bert, Spacy, etc.) or an embedding model that is trained to perform customized embedding.

The computing apparatus 100 may transmit information about a training data set to the embedding model 510 (e.g., labels in the training data set to the embedding model 210).

The computing apparatus 100 may generate vectors corresponding to the labels in the training data set using the embedding model 510. For example, in the example shown in FIG. 5, the computing apparatus 100 may input labels A, B, C, . . . , Y, and Z of the training data set to the embedding model 510. The computing apparatus 100 may obtain vectors (e.g., word embedding vectors, speech embedding vectors, etc.) corresponding to the labels A, B, C, . . . , Y, and Z using the embedding model 510.

The computing apparatus 100 may store the vectors corresponding to the labels of the training data set in the form of a second dictionary. In an example, the computing apparatus 100 may implement the second dictionary in a data structure (e.g., a hash table, a B-tree, etc.) for fast data retrieval of an embedding vector based on a corresponding label.

Figure 6:
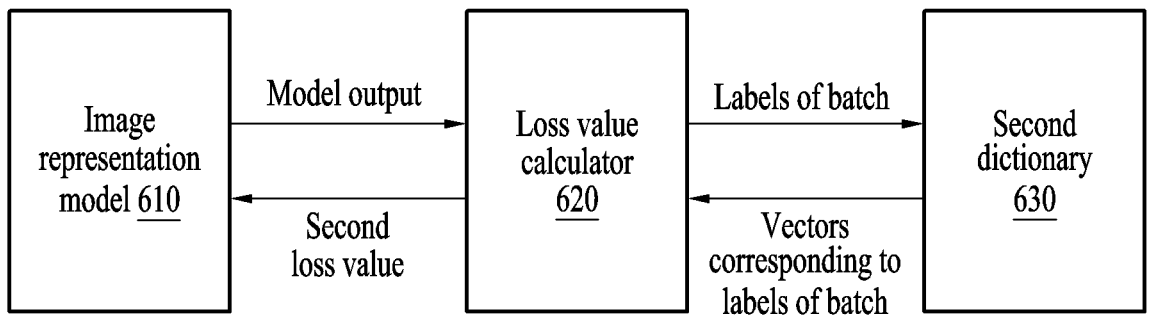
FIGS. 6 and 7 illustrate an example of a computing apparatus training an image representation model, according to one or more embodiments.
Figure 7:
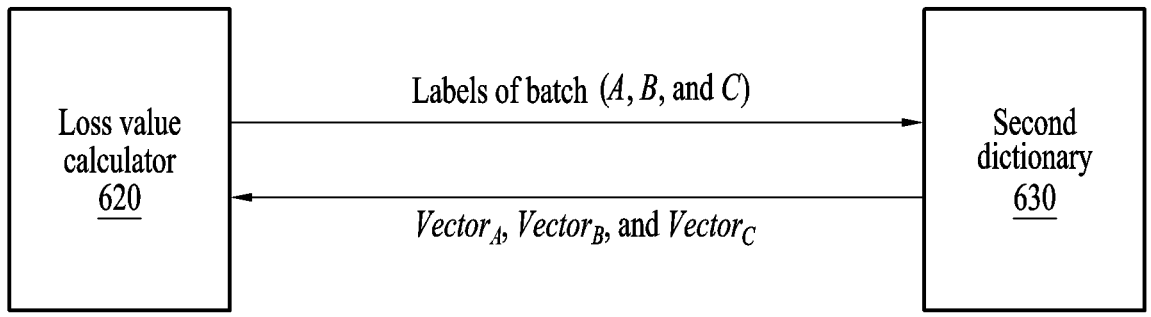

FIGS. 6 and 7 illustrate an example of a computing apparatus training an image representation model, according to one or more embodiments.

Referring to FIG. 6, an image representation model 610 (e.g., the image representation model 110 of FIG. 1 or the image representation model 310 of FIG. 3), a loss value calculator 620, and a second dictionary 630 are shown. The second dictionary 630 may correspond to the second dictionary described above with reference to FIG. 5.

The computing apparatus 100 may generate a first batch by randomly extracting (or sampling) images from a training data set. If the batch size is, for example, "N", the computing apparatus 100 may generate the first batch by randomly extracting (or sampling) N images from the training data set.

In an example, the computing apparatus 100 may form an image set I corresponding to the first batch by augmenting the images in the first batch. For example, the computing apparatus 100 may generate first augmented images by performing first augmentation (e.g., scaling, rotation, cropping, color adjustment, contrast adjustment, etc.) on the images in the first batch. For example, the computing apparatus 100 may generate second augmented images by performing second augmentation (e.g., scaling, rotation, cropping, color adjustment, contrast adjustment, etc.) on the images in the first batch. The first augmentation and the second augmentation may be the same as or different from each other. If the batch includes N images, the number of first augmented images may be "N" and the number of second augmented images may be "N". The computing apparatus 100 may form the image set I including the first augmented images and the second augmented images. The number of images in the image set I may be "2N".

The computing apparatus 100 may train the image representation model 610 based on the image set I.

The computing apparatus 100 may input an anchor image in the image set I to the image representation model 610. The computing apparatus 100 may generate an anchor image embedding vector for the anchor image using the image representation model 610.

The computing apparatus 100 may input negative samples of the anchor image to the image representation model 610. The computing apparatus 100 may generate first image embedding vectors for the negative samples using the image representation model 610.

The computing apparatus 100 may input positive samples of the anchor image to the image representation model 610. The computing apparatus 100 may generate second image embedding vectors for the positive samples using the image representation model 610.

The loss value calculator 620 may receive a model output (e.g., the generated anchor image embedding vector, the generated first image embedding vectors, and the generated second image embedding vectors) from the image representation model 610.

The loss value calculator 620 may determine similarities (e.g., cosine similarities, inner products, Euclidean distances, etc.) between the anchor image and the negative samples using the anchor image embedding vector and the generated first image embedding vectors.

The loss value calculator 620 may determine similarities (e.g., cosine similarities, inner products, Euclidean distances, etc.) between the anchor image and the positive samples using the anchor image embedding vector and the second image embedding vectors.

The loss value calculator 620 may transmit the labels of the first batch to the second dictionary 630. The loss value calculator 620 may obtain (or receive) vectors corresponding to the labels of the first batch from the second dictionary 630. The vectors corresponding to the labels of the training data set may be stored in the second dictionary 630. The loss value calculator 620 may obtain (or receive) the vectors corresponding to the labels of the first batch from the second dictionary 630 at a high speed upon transmitting the labels of the first batch to the second dictionary 630. In other words, the loss value calculator 620 may retrieve the vectors corresponding to the labels of the first batch from the second dictionary 630.

For example, in the example shown in FIG. 7, the loss value calculator 620 may transmit the labels A, B, and C of the first batch to the second dictionary 630. The loss value calculator 620 may receive, from the second dictionary 630, a vector $Vector_A$ corresponding to the label A, a vector $Vector_B$ corresponding to the label B, and a vector $Vector_C$ corresponding to the label C.

The loss value calculator 620 may determine a loss value based on the similarities between the anchor image and the negative samples, the similarities between the anchor image and the positive samples, and the similarities between the anchor image embedding vector and the vectors corresponding to the labels of the anchor image. For example, a second loss function may be expressed by Equation 2 below. The loss value calculator 620 may determine a loss value $L_i^{semsup}$ for an anchor image i through Equation 2 below.

$$L^{semsup} = \sum_{i \in I} L_i^{semsup} = \alpha \sum_{i \in I} \frac{-1}{|P(i)|} \sum_{p \in P(i)} \log \frac{\exp(z_i \cdot z_p/\tau)}{\sum_{a \in A(i)} \exp(z_i \cdot z_a/\tau)} + (1-\alpha) \sum_{i \in I} -sim(z_i, \vec{y}_r)$$

Equation 2

In Equation 2 above, I denotes the image set described above, and i denotes an anchor image. P(i) denotes a set of positive samples and may be included in I, |P(i)| denotes the number of positive samples, and p denotes a positive sample. A(i) denotes a set of negative samples (or the set of samples except for the anchor image i in I), |A(i)| denotes the number of negative samples (or the number of samples except for the anchor image i in I), and a denotes a negative sample (or any sample except for the anchor image i).

In Equation 2 above, τ denotes a hyperparameter, and $z_i \cdot z_a$ denotes an image similarity between the anchor image i and the image of sample a. The loss value calculator 620 may determine a dot product between (i) an anchor image embedding vector $z_i$ and (ii) an image embedding vector $z_a$ of the sample a, and that dot product may be the image similarity between the anchor image i and the sample a. The term $z_i \cdot z_p$ denotes an image similarity between the anchor image i and the image of a positive sample p. The loss value calculator 620 may determine a dot product between (i) the anchor image embedding vector $z_i$ and (ii) an image embedding vector $z_p$ of the positive sample, and that dot product may be the image similarity between the anchor image i and the image of the positive sample p. The term $sim(z_i, \tilde{y}_i)$ denotes a similarity (e.g., a cosine similarity, an inner product, a Euclidean distance, etc.) between the anchor image embedding vector $z_i$ and a vector $\tilde{y}_i$ corresponding to the anchor image i.

In Equation 2 above, exp denotes an exponential function.

In Equation 2 above, α denotes a weight and may be any number between "0" and "1".

The loss value calculator 620 may sum initial loss value (e.g., $$\frac{-1}{|P(i)|} \sum_{p \in P(i)} \log \frac{\exp(z_i \cdot z_p/\tau)}{\sum_{a \in A(i)} \exp(z_i \cdot z_a/\tau)}$$

of Equation 2 above) for anchor images in the image set I, and apply the weight α to a summation result (e.g., $$\sum_{i \in I} \frac{-1}{|P(i)|} \sum_{p \in P(i)} \log \frac{\exp(z_i \cdot z_p/\tau)}{\sum_{a \in A(i)} \exp(z_i \cdot z_a/\tau)}$$

of Equation 2 above) (hereinafter, referred to as a "first summation result") of the initial values for the anchor images. The loss value calculator 620 may sum negative values (e.g., $-sim(z_i, \tilde{y}_i)$ of Equation 2 above) of similarities between each anchor image embedding vector and vectors corresponding to labels of the anchor images, and apply the weight 1−α to a summation result (e.g., $\Sigma_{i \in I} -sim(z_i, \tilde{y}_i)$ of Equation 2 above) (hereinafter, referred to as a "second summation result") of the negative values of the similarities. The loss value calculator 620 may calculate a second loss value $L^{semsup}$ in the first batch by adding the first summation result to which the weight α is applied and the second summation result to which the weight 1−α is applied.

The loss value calculator 620 may transmit the second loss value in the first batch to the image representation model 610.

The computing apparatus 100 may update the weights of the image representation model 610 based on the second loss value in the first batch. For example, the computing apparatus 100 may update the weights of the image representation model 610 so as to reduce the second loss value in the first batch.

In an example, as $sim(z_i, \tilde{y}_i)$ increases, $L_i^{semsup}$ may decrease, and the second loss value $L^{semsup}$ in the first batch may decrease. Accordingly, the image representation model 610 may be trained so that the anchor image embedding vector becomes similar to a vector (e.g., a word vector) corresponding to a label of the anchor image, and the performance of image classification may further improve.

Table 3 below shows examples of the accuracy of image classification based on the existing supervised contrastive learning (SupCon) and the accuracy of image classification based on the training (semSupCon) described with reference to FIG. 7.

TABLE 3

|  | Architecture | Dataset | Augmentation | Batch | Top-1 |
| --- | --- | --- | --- | --- | --- |
| SupCon | Resnet-50 | CIFAR100 | TwoCropTransform | 256 | 70.61 |
| semSupCon | Resnet-50 | CIFAR100 | TwoCropTransform | 256 | 77.57 |
| SupCon | Resnet-50 | CIFAR10 | TwoCropTransform | 256 | 92.05 |
| semSupCon | Resnet-50 | CIFAR10 | TwoCropTransform | 256 | 95.8 |

Referring to Table 3 above, when a dataset of CIFAR100 is used for image classification, the Top-1 accuracy of image classification based on the example (semSupCon) is higher than the Top-1 accuracy of image classification based on SupCon. When a dataset of CIFAR10 is used for image classification, the Top-1 accuracy of image classification based on the example (semSupCon) is higher than the Top-1 accuracy of image classification based on SupCon.

Figure 8:
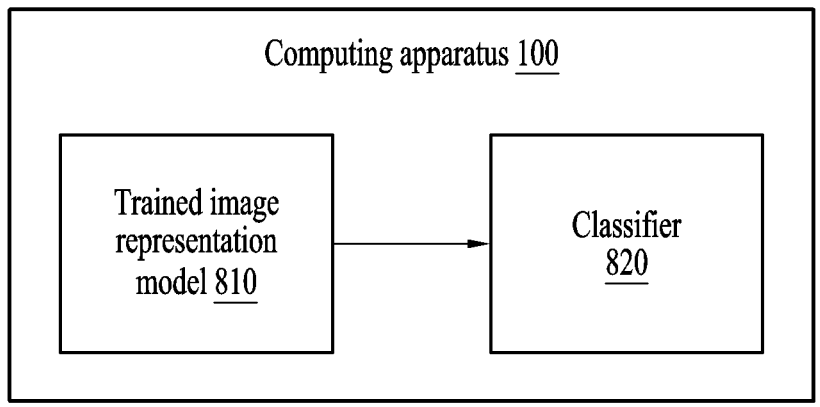
FIG. 8 illustrates an example of a computing apparatus training a classifier, according to one or more embodiments.

FIG. 8 illustrates an example of a computing apparatus training a classifier, according to one or more embodiments.

Referring to FIG. 8, the computing apparatus 100 may include a trained image representation model 810 and a classifier 820.

The computing apparatus 100 may improve the performance of a downstream task that utilizes the trained image representation model 810.

The computing apparatus 100 may generate the trained image representation model 810 by training the image representation model 110, 310, or 610 as described above.

The image representation model 110, 310, or 610 may include an encoding model and a projection model, and the trained image representation model 810 may include only a trained encoding model. In other words, when the computing apparatus 100 completes training the image representation model 110, 310, or 610, the projection model may be discarded.

The computing apparatus 100 may fix weights of the trained image representation model 810 (or the trained encoding model). The computing apparatus 100 may input a training image to the trained image representation model 810 and generate a feature vector corresponding to the input training image using the trained image representation model 810. Specifically, the computing apparatus 100 may input the generated feature vector to the classifier 820, calculate a difference between an output result of the classifier 820 and a label, and train the classifier 820 so as to reduce the calculated difference.

The trained classifier may be implemented on a server or an electronic device (e.g., an electronic device 1100 which will be described later), and may, when an input (e.g., an image, etc.) is provided, perform a task (e.g., classification) based on the input.

Figure 9:
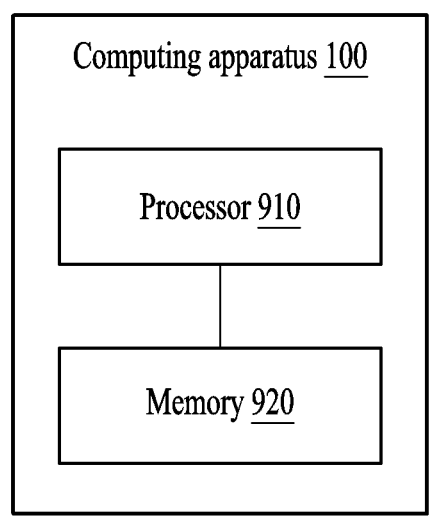
FIG. 9 illustrates an example of a computing apparatus, according to one or more embodiments.

FIG. 9 illustrates an example of a computing apparatus, according to one or more embodiments.

Referring to FIG. 9, the computing apparatus 100 may include a processor 910 and a memory 920.

The memory 920 may store the image representation model 110, 310, or 610, the embedding model 210 or 510, and a dictionary (e.g., the first dictionary 330 and/or the second dictionary 630).

The processor 910 may operations of the computing apparatus 100 described through FIGS. 1 to 8.

The processor 910 may generate an anchor image embedding vector for an anchor image using any of the image representation models 110, 310, or 610.

The processor 910 may determine first similarities (e.g., $z_i \cdot z_a$) between the anchor image and negative samples of the anchor image using first image embedding vectors for the negative samples and the generated anchor image embedding vector.

The processor 910 may determine second similarities (e.g., $z_i \cdot z_p$) between the anchor image and positive samples of the anchor image using second image embedding vectors for the positive samples and the generated anchor image embedding vector.

The processor 910 may obtain third similarities (e.g., sim($\tilde{y}_i, \tilde{y}_a$)) between a label of the anchor image and labels of the negative samples and a vector (e.g. $\tilde{y}_i$) corresponding to the label of the anchor image, and may obtain one of the third similarities.

The processor 910 may determine the loss value based on the one of the third similarities and a fourth similarity (e.g., sim($z_i, \tilde{y}_i$), the determined first similarities, and the determined second similarities. The fourth similarity may be a similarity between the vector corresponding to the label of the anchor image and the generated anchor image embedding vector.

As an example, the processor 910 may apply the obtained third similarities as weights to each of the determined first similarities. The processor 910 may calculate normalized values e.g., $$\frac{|A(i)|}{\sum_{a \in A(i)} sim\ (\tilde{y}_i, \tilde{y}_a)}$$

in Equation 1 above) for the obtained third similarities. The processor 910 may determine the loss value (e.g., $L_i^{wsupnorm}$) for the anchor image using a result of applying the obtained third similarities as weights to each of the determined first similarities, the calculated normalized values, and the determined second similarities. The processor 910 may determine the loss value (e.g., $L_i^{wsupnorm}$) for the anchor image through the loss function of Equation 1 above.

As another example, the processor 910 may determine an initial loss value using the determined first similarities and the determined second similarities. The processor 910 may apply a first weight (e.g., $\alpha$ in Equation 2 above) to the determined initial loss value, and apply a second weight (e.g., $1-\alpha$ in Equation 2 above) to the fourth similarity. The processor 910 may determine the loss value (e.g., $L_i^{semsup}$) for the anchor image by subtracting the fourth similarity to which the second weight is applied from the initial loss value to which the first weight is applied. The processor 910 may determine the loss value for the anchor image through the loss function of Equation 2 above.

The processor 910 may update the weights of the image representation model 110, 310, or 610 based on the determined loss value.

As an example, the processor 910 may calculate a first loss value (e.g., $L^{wsupnorm}$) by summing loss values (e.g., $L_i^{wsupnorm}$) for anchor images. The processor 910 may update the weights of the image representation model 110, 310, or 610 to reduce the first loss value.

As another example, the processor 910 may calculate a second loss value (e.g., $L^{semsup}$) by summing the loss values (e.g., $L_i^{semsup}$) for the anchor images. The processor 910 may update the weights of the image representation model 110, 310, or 610 to reduce the second loss value.

In an example, the processor 910 may determine (or calculate) similarities for combinable pairs of labels of the training data set using the embedding model 210. The processor 910 may generate the first dictionary 330 to store the similarities for the combinable pairs of the labels of the training data set. The processor 910 may form a batch by extracting images in the training data set. The processor 910 may form an image set (e.g., the image set I) corresponding to the formed batch by performing augmentation on images in the formed batch. The processor 910 may retrieve similarities for combinable pairs of labels of the formed batch from the first dictionary 330. The processor 910 may obtain the third similarities between the label of the anchor image and the labels of the negative samples, among the retrieved similarities.

In an example, the processor 910 may generate vectors (e.g., word vectors, speech vectors, etc.) corresponding to the labels of the training data set using the embedding model 510. The processor 910 may generate the second dictionary 630 to store the generated vectors. The processor 910 may form a batch by extracting images in the training data set, and form an image set corresponding to the formed batch by performing augmentation on images in the formed batch. The processor 910 may retrieve vectors corresponding to the labels of the formed batch from the second dictionary 630. The processor 910 may obtain the vector corresponding to the label of the anchor image among the vectors retrieved from the second dictionary 630.

In an example, in response to the completion of training the image representation model 110, 310, or 610, the processor 910 may train the classifier 820. In this regard, the description of the classifier training in FIG. 8 may apply, and thus, the detailed description of training the classifier 820 is omitted.

The description provided with reference to FIGS. 1 to 8 may apply to the computing apparatus of FIG. 9. While reference is made above to singular "processors" and "apparatuses", the operations described here may be implemented on many architectures and combinations of processors/computing devices, etc.

Figure 10:
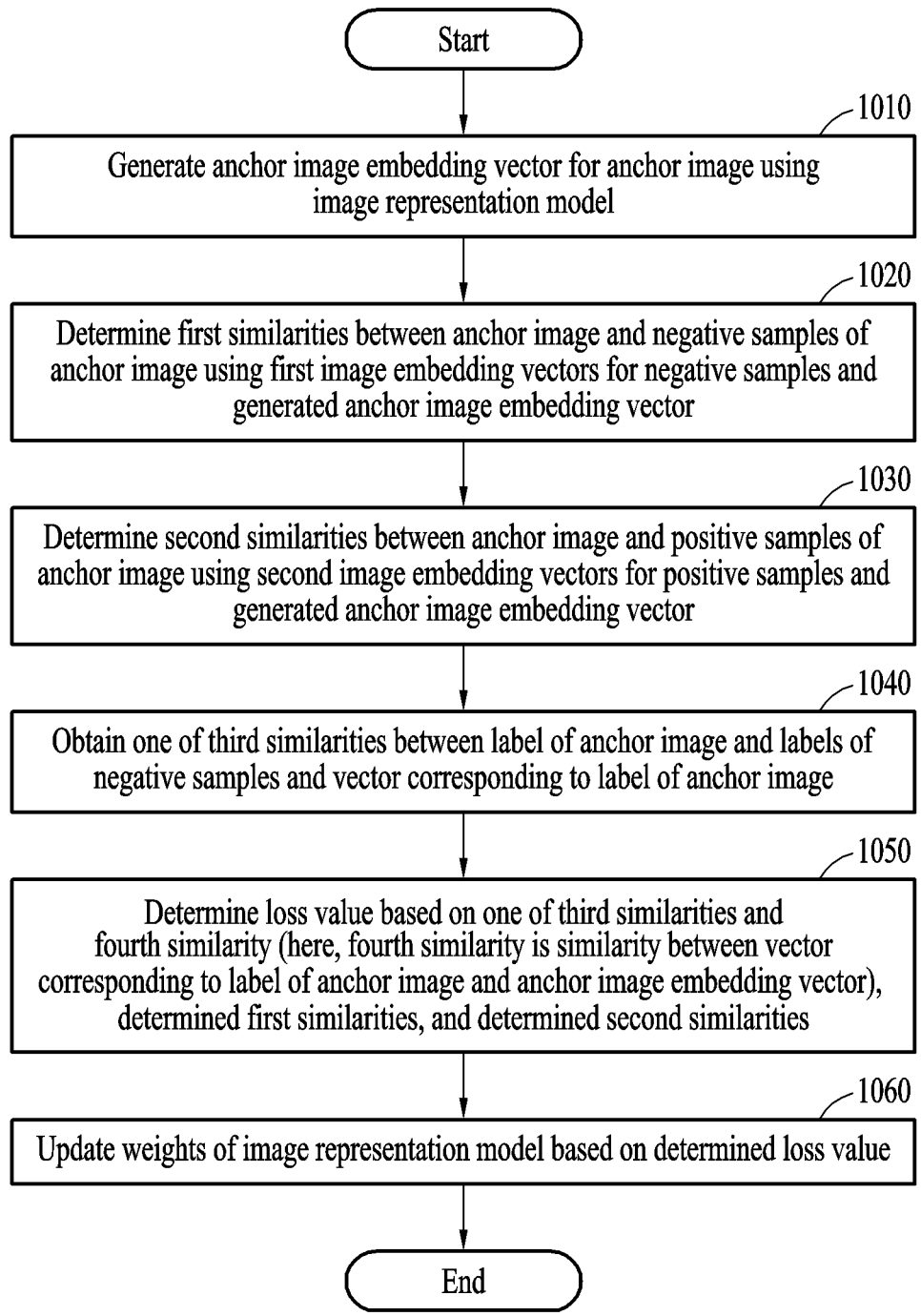
FIG. 10 illustrates an example of a training method, according to one or more embodiments.

FIG. 10 illustrates an example of a training method, according to one or more embodiments.

The training method of FIG. 10 may be performed by the computing apparatus 100.

In operation 1010, the computing apparatus 100 may generate an anchor image embedding vector for an anchor image using the image representation model 110, 310, or 610.

In operation 1020, the computing apparatus 100 may determine first similarities between the anchor image and negative samples of the anchor image using first image embedding vectors for the negative samples and the generated anchor image embedding vector.

In operation 1030, the computing apparatus 100 may determine second similarities between the anchor image and positive samples of the anchor image using second image embedding vectors for the positive samples and the generated anchor image embedding vector.

In operation 1040, the computing apparatus 100 may obtain one of a vector corresponding to a label of the anchor image and third similarities between the label of the anchor image and labels of the negative samples. That is, the computing apparatus 100 may obtain the third similarities or the vector corresponding to the label of the anchor image.

In operation 1050, the computing apparatus 100 may determine a loss value based on (i) the determined first similarities, (ii) the determined second similarities, and (iii) one of the third similarities and a fourth similarity. When the third similarities are obtained, the computing apparatus 100 may determine the loss value through the obtained third similarities, the determined first similarities, the determined second similarities, and Equation 1 above. When the vector corresponding to the label of the anchor image is obtained, the computing apparatus 100 may calculate the fourth similarity (a similarity between the vector corresponding to the label of the anchor image and the anchor image embedding vector), and determine the loss value through the fourth similarity, the determined first similarities, the determined second similarities, and Equation 2 above.

In operation 1060, the computing apparatus 100 may update weights of the image representation model 110, 310, or 610 based on the determined loss value (e.g., the first loss value or the second loss value).

The description provided with reference to FIGS. 1 to 9 may apply to the training method of FIG. 10.

Figure 11:
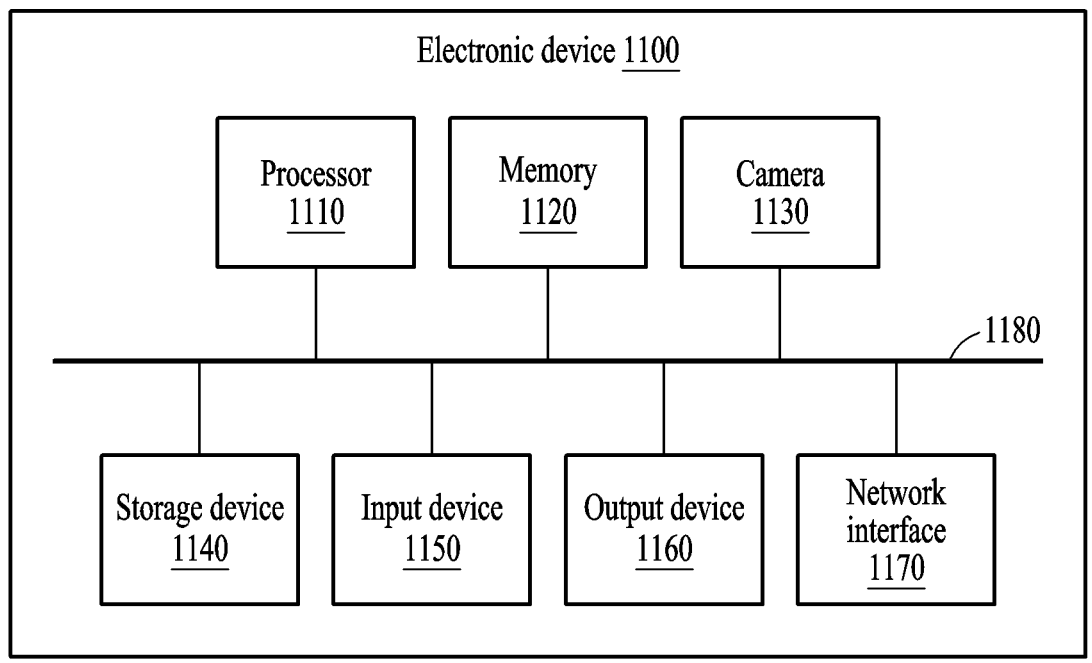
FIG. 11 illustrates an example configuration of an electronic device, according to one or more embodiments.

FIG. 11 illustrates an example configuration of an electronic device, according to one or more embodiments.

Referring to FIG. 11, the electronic device 1100 may include a processor 1110, a memory 1120, a camera 1130, a storage device 1140, an input device 1150, an output device 1160, a network interface 1170, which may communicate with each other through a communication bus 1180. For example, the electronic device 1100 may be implemented as at least a part of a mobile device such as a mobile phone, a smart phone, a PDA, a netbook, a tablet computer or a laptop computer, a wearable device such as a smart watch, a smart band or smart glasses, a home appliance such as a television, a smart television or a refrigerator, a security device such as a door lock, or a vehicle such as an autonomous vehicle or a smart vehicle. The electronic device 1100 may be implemented as at least a part of a server. The electronic device 1100 may structurally and/or functionally include the computing apparatus 100 described with reference to FIGS. 1 to 10.

The processor 1110 may execute functions and instructions to be executed in the electronic device 1100. For example, the processor 1110 may process the instructions stored in the memory 1120 or the storage device 1140. The processor 1110 may perform the one or more operations of the computing apparatus 100 described through FIGS. 1 to 9. Although "processor" is used in the singular, embodiments may be implemented on combinations of processors (described below) and "processor" as used herein refers to "one or more processors".

The memory 1120 may include a computer-readable storage medium or a computer-readable storage device. The memory 1120 may store instructions to be executed by the processor 1110 and may store related information while software and/or an application is executed by the electronic device 1100.

The camera 1130 may capture a photo and/or a video, which may be processed by any of the embodiments described above. The storage device 1140 includes a computer-readable storage medium or computer-readable storage device. The storage device 1140 may store a high quantity of information (relative to the memory 1120) and may do so persistently (e.g., without the needing continuous power to do so). For example, the storage device 1140 may include a magnetic hard disk, an optical disc, a flash memory, a floppy disk, or other non-volatile memories.

The input device 1150 may receive an input from the user in traditional input manners through a keyboard and a mouse, and in new input manners such as a touch input, a voice input, and an image input. For example, the input device 1150 may include a keyboard, a mouse, a touch screen, a microphone, or any other device that detects the input from the user and transmits the detected input to the electronic device 1100.

The output device 1160 may provide an output of the electronic device 1100 to the user through a visual, auditory, or haptic channel. The output device 1160 may include, for example, a display, a touch screen, a speaker, a vibration generator, or any other device that provides the output to the user. The network interface 1170 may communicate with an external device through a wired or wireless network.

The computing apparatuses, the electronic devices, the processors, the memories, the image sensors, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A training method performed by a computing apparatus, the training method comprising:
   generating an anchor image embedding vector for an anchor image using an image representation model;
   determining first similarities between the anchor image and negative samples of the anchor image using first image embedding vectors for the negative samples and the generated anchor image embedding vector;
   determining second similarities between the anchor image and positive samples of the anchor image using second image embedding vectors for the positive samples and the generated anchor image embedding vector;
   obtaining one of a vector corresponding to a label of the anchor image and third similarities between the label of the anchor image and labels of the negative samples;
   determining a loss value for the anchor image based on (i) the determined first similarities, (ii) the determined second similarities, and (iii) one of the obtained third similarities and a fourth similarity, wherein the fourth similarity is a similarity between the obtained vector and the generated anchor image embedding vector; and
   updating weights of the image representation model based on the determined loss value.

2. The training method of claim 1, wherein
the positive samples and the anchor image belong to a same class, and the negative samples do not belong to the class.

3. The training method of claim 1, wherein the determining of the loss value comprises:
applying the obtained third similarities as weights to each of the determined first similarities;
calculating normalized values for the obtained third similarities; and
determining the loss value using a result of applying the obtained third similarities as weights to each of the determined first similarities, the calculated normalized values, and the determined second similarities.

4. The training method of claim 1, further comprising:
determining similarities of pairings of labels of respective images in a training data set using an embedding model;
generating a first dictionary to store the similarities for the pairings;
forming a batch of images extracted from the training data set;
forming an image set corresponding to the batch by performing augmentation on the images in the formed batch; and
retrieving, from the first dictionary, similarities for respective pairings of labels of the batch.

5. The training method of claim 4, wherein
the obtaining comprises obtaining the third similarities from among the retrieved similarities.

6. The training method of claim 1, wherein
the third similarities are similarities between the vector corresponding to the label of the anchor image and vectors corresponding to the labels of the negative samples, and
the vector corresponding to the label of the anchor image and the vectors corresponding to the labels of the negative samples are generated by an embedding model.

7. The training method of claim 1, wherein the determining of the loss value comprises:
determining an initial loss value using the determined first similarities and the determined second similarities;
applying a first weight to the determined initial loss value;
applying a second weight to the fourth similarity; and
determining the loss value by subtracting the fourth similarity to which the second weight is applied from the initial loss value to which the first weight is applied.

8. The training method of claim 7, wherein the sum of the first weight and the second weight is 1.

9. The training method of claim 1, further comprising:
generating vectors respectively corresponding to labels of a training data set using an embedding model;
generating a second dictionary to store the generated vectors;
forming a batch by extracting images from the training data set;
forming an image set corresponding to the batch by performing augmentation on the images in the formed batch; and
retrieving vectors corresponding to labels of the batch from the second dictionary.

10. The training method of claim 9, wherein
the obtaining comprises obtaining the vector corresponding to the label of the anchor image from among the retrieved vectors.

11. A computing apparatus, comprising:
a memory configured to store one or more instructions; and
a processor configured to execute the stored instructions,
wherein, when the instructions are executed, the processor is configured to:
generate an anchor image embedding vector for an anchor image using an image representation model,
determine first similarities between the anchor image and negative samples of the anchor image using first image embedding vectors for the negative samples and the generated anchor image embedding vector,
determine second similarities between the anchor image and positive samples of the anchor image using second image embedding vectors for the positive samples and the generated anchor image embedding vector,
obtain one of a vector corresponding to a label of the anchor image and third similarities between the label of the anchor image and labels of the negative samples,
determine a loss value for the anchor image based on (i) the determined first similarities, (iii) the determined second similarities, and (iii) one of the obtained third similarities and a fourth similarity, wherein the fourth similarity is a similarity between the obtained vector and the generated anchor image embedding vector, and
update weights of the image representation model based on the determined loss value.

12. The computing apparatus of claim 11, wherein the positive samples and the anchor image belong to a same class, and the negative samples and the anchor image do not belong to the class.

13. The computing apparatus of claim 11, wherein the processor is configured to apply the obtained third similarities as weights to each of the determined first similarities, calculate normalized values for the obtained third similarities, and determine the loss value using a result of applying the obtained third similarities as weights to each of the determined first similarities, the calculated normalized values, and the determined second similarities.

14. The computing apparatus of claim 11, wherein the processor is configured to determine similarities of pairings of labels of respective images in a training data set using an embedding model, generate a first dictionary to store the similarities for the pairings, form a batch of images extracted from the training data set, form an image set corresponding to the batch by performing augmentation on the images in the formed batch, and retrieve, from the first dictionary, similarities for respective pairings of labels of the batch.

15. The computing apparatus of claim 14, wherein the processor is configured to obtain the third similarities from among the retrieved similarities.

16. The computing apparatus of claim 11, wherein
the third similarities are similarities between the vector corresponding to the label of the anchor image and vectors corresponding to the labels of the negative samples, and
the vector corresponding to the label of the anchor image and the vectors corresponding to the labels of the negative samples are generated by an embedding model.

17. The computing apparatus of claim 11, wherein the processor is configured to determine an initial loss value using the determined first similarities and the determined second similarities, apply a first weight to the determined initial loss value, apply a second weight to the fourth similarity, and determine the loss value by subtracting the fourth similarity to which the second weight is applied from the initial loss value to which the first weight is applied.

18. The computing apparatus of claim 17, wherein the sum of the first weight and the second weight is 1.

19. The computing apparatus of claim 11, wherein the processor is configured to generate vectors respectively corresponding to labels of a training data set using an embedding model, generate a second dictionary to store the generated vectors, form a batch by extracting images from the training data set, form an image set corresponding to the formed batch by performing augmentation on the images in the formed batch, and retrieve vectors corresponding to labels of the formed batch from the second dictionary.

20. The computing apparatus of claim 19, wherein the processor is configured to obtain the vector corresponding to the label of the anchor image from among the retrieved vectors.

* * * * *